United States Patent [19]

Pemberton

[11] 4,121,726
[45] Oct. 24, 1978

[54] APPARATUS FOR DISPENSING PAPER ARTICLES

[76] Inventor: Carl J. Pemberton, 2060 N. Livingston Ave., Indianapolis, Ind. 46222

[21] Appl. No.: 791,374

[22] Filed: Apr. 27, 1977

[51] Int. Cl.² .............................................. B65H 3/00
[52] U.S. Cl. ..................................... 221/37; 221/40; 221/213
[58] Field of Search .................... 271/18, 18.3, 19, 21, 271/22, 24, 42, 128, 130; 221/36, 37, 40, 210, 213–216, 220, 246, 248, 249, 255, 262

[56] References Cited

U.S. PATENT DOCUMENTS

| | | | |
|---|---|---|---|
| 1,857,074 | 5/1932 | Wright et al. | 221/213 |
| 2,457,758 | 12/1948 | Vore | 221/210 |
| 2,568,413 | 9/1951 | Rubisch | 221/213 |
| 2,896,820 | 7/1959 | Clark et al. | 221/210 |
| 3,705,665 | 12/1972 | Gunzler | 221/279 |

FOREIGN PATENT DOCUMENTS

| | | | |
|---|---|---|---|
| 1,034,011 | 7/1958 | Fed. Rep. of Germany | 221/210 |
| 922,969 | 4/1963 | United Kingdom | 221/36 |

*Primary Examiner*—Robert B. Reeves
*Assistant Examiner*—H. Grant Skaggs
*Attorney, Agent, or Firm*—Jenkins, Coffey & Hyland

[57] ABSTRACT

An apparatus for dispensing cup-shaped paper coffee filters from the top of a nested stack of such filters includes a box for storing and retaining the stack, a lever connected by a hinge to the lid of the box, apparatus for moving the lever to engage the top filter of the stack, and flexible plastic fingers for holding all of the filters except the top one in place as the lever engages the top filter and removes it from the stack. The lid of the box is hinged so that the box can be opened to remove the top filter from the end of the lever. Once the lever has engaged the top filter, the end of the lever is moved away from the axis of the filter stack. Lifting the lid simultaneously imparts an axially upward component to the motion of the lever, so that the lever both separates the top filter from the stack and lifts it. The filter can then be easily removed from the end of the lever.

19 Claims, 4 Drawing Figures

APPARATUS FOR DISPENSING PAPER ARTICLES

This invention relates to apparatus for dispensing a paper or paper-like article from the end of a stack of such articles. Particularly, this invention is useful for dispensing cupuliform filters for drip coffee makers and the like.

The popularity of drip-type coffee makers in recent years, and particularly of those coffee makers which use paper or paper-like filters to keep coffee grounds from contaminating the brewed coffee has brought about a spectacular increase in the sales of cupuliform paper filters for the brewing baskets. A significant and irritating characteristic of such filters is that they are packaged in stacks, each filter nested in a filter immediately beneath it. The filters in such stacks are so tightly nested that it is frequently difficult to separate the end filter (either top or bottom) from the stack so that this filter can be used. Frequently, the end filter will be torn inadvertently when the user attempts to separate it from the stack. As one who frequently brews coffee in such an apparatus is aware, attempting to remove one filter from the stack can be a frustrating and irritating experience.

It is a primary object of the present invention to provide an apparatus which considerably simplifies the process of removing a paper coffee filter or like article from a stack of such articles. Generally, of course, paper coffee filters are cup-like in their configuration. However, the instant invention is not to be considered as limited to cupuliform paper and paper-like articles.

According to the instant invention, an apparatus for dispensing a paper article from the end of a stack of such articles includes means for retaining the stack, means for engaging the end article of the stack, the engaging means projecting into contact with the end article, means for moving the engaging means away from the stack axis and means for stripping the end article from the next adjacent article in the stack as the engaging means moves the end article away from the stack axis.

In the illustrated embodiment, the apparatus further comprises means for imparting an axial component to the motion of the engaging means to move the end article away along the stack axis as well as radially away from the stack axis.

In the illustrated embodiment, the retaining means comprises a box-like structure having a bottom wall upon which the stack rests and four side walls, at least one of the side walls including a stop for limiting upward movement of a portion of the top article of the stack. In the illustrated embodiment, each of three adjacent side walls includes such a stop. Further according to the illustrated embodiment, the means for stripping the end article from the next adjacent article includes a flexible element and means for supporting the flexible element adjacent the stack. The flexible element is supported for projection into interfering relationship with the top article of the stack. The flexible element is sufficiently flexible that the force it exerts on the top article will be overcome by the engaging means to move the top article radially away from the axis, but to hold down the remaining articles of the stack. In the illustrated embodiment, the articles are cupuliform paper or paper-like coffee filters in a nested stack. The engaging means projects down into the cup-like interior of the top article in the stack.

In the illustrated embodiment, the means for imparting an axial component to the motion of the top article includes a hinged lid on the box, the lid having a handle and defining a slot which extends generally radially of the stack axis. The engaging means includes a first lever having first and second ends and means for pivotally attaching the first lever intermediate its first and second ends to the underside of the lid. The second end of the first lever extends through the slot so that the first lever can be hand-actuated to dispense the top article. The engaging means further includes a second lever having first and second ends and means for pivotally attaching the first end of the second lever to the underside of the lid. The second end of the second lever projects downwardly into the top article. Means are provided for connecting the second lever intermediate its ends to the first lever adjacent its first end. Hand actuation of the first lever thereby moves the second lever radially away from the stack axis. The second end of the second lever is formed to provide a point which engages the cup-like interior surface of the top article to overcome the tendency of the nested arrangement to hold the top article when the second lever moves radially away from the stack axis. A flexible joint, illustratively including a resilient metal strap, is provided on the second lever intermediate its first and second ends. The flexible joint damps, to a degree, motion of the second end of the second lever away from the stack axis to minimize the likelihood of damage to the top article as it is stripped away from the stack.

The illustrative apparatus further includes means for yieldably urging the second end of the second lever toward the stack axis. The means for pivotally attaching the first end of the second lever to the underside of the lid includes a double-acting hinge. The underside of the lid includes means providing a notch in which the first end of the second lever rests, the double-acting hinge providing for movement of the first end of the second lever downwardly out of the notch and away from the stack axis as the first lever is actuated.

The invention may best be understood by referring to the following description and accompanying drawings which illustrate the invention. In the drawings.

Figure 3:
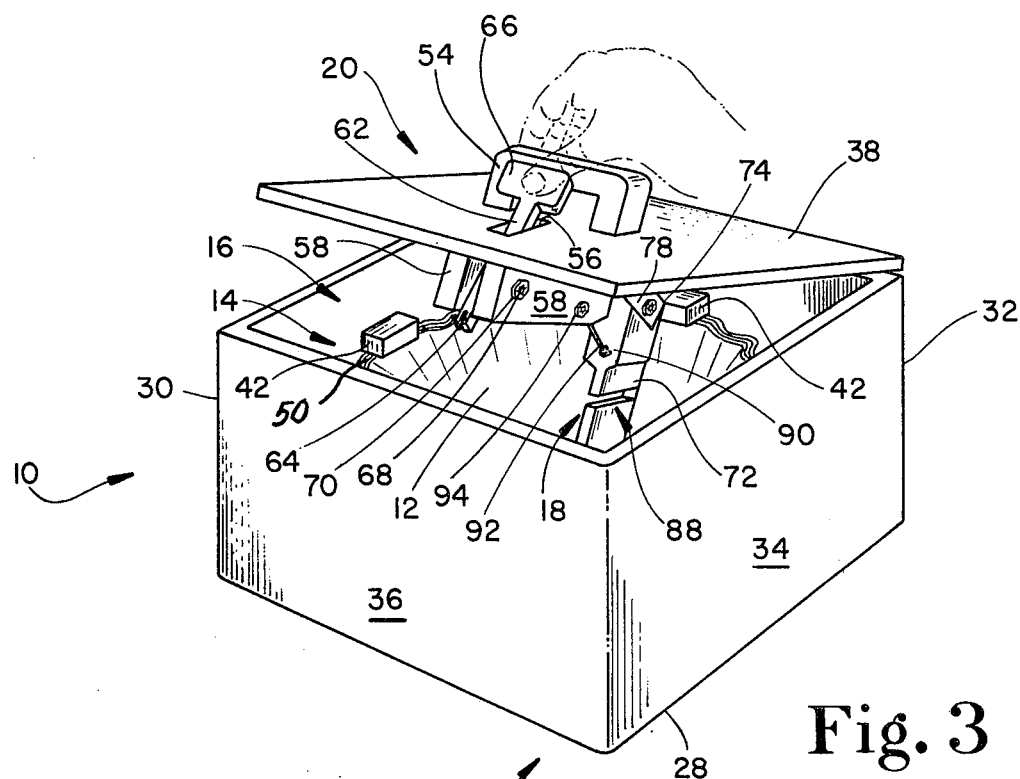
Figure 4:
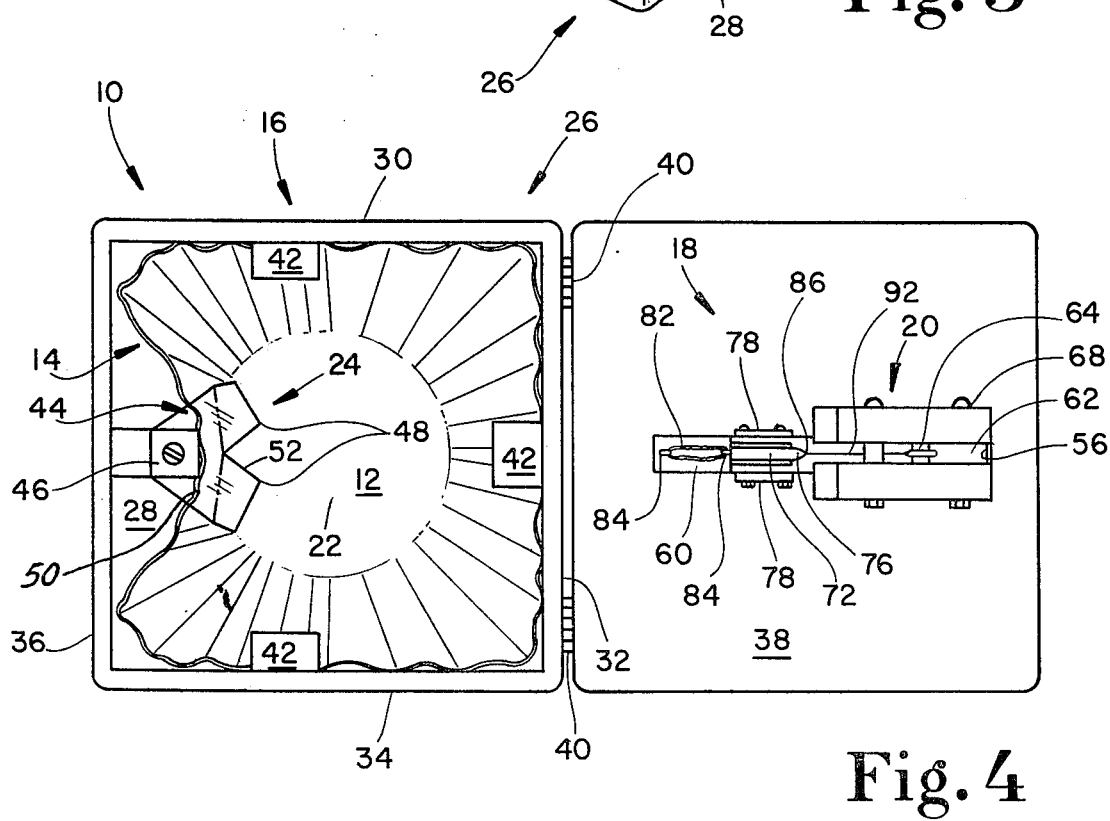

FIG. 3 is a perspective view of the apparatus of the instant invention showing the front, top and one side of the apparatus, with the top in its open or dispensing orientation, the hand of an operator being illustrated on the apparatus in broken lines; and, FIG. 4 is a top plan view of the apparatus of the instant invention, with the top or lid in its fully open position, the apparatus containing a stack of nested cupuliform coffee filters.

Referring now to the drawings, and especially FIGS. 3–4, an apparatus 10 for dispensing a cupuliform paper coffee filter 12 from the top of a nested stack 14 of such filters includes means 16 for retaining the stack in the apparatus, means 18 for engaging the top filter 12, means 20 for moving the engaging means away from the axis 22 of the stack 14, and means 24 for stripping the top filter 12 from the next adjacent filter in stack 14.

Apparatus 10 includes a box 26 having a bottom 28, four side walls 30, 32, 34, 36 and a lid 38. Lid 38 is attached to a rear side wall 32 by two hinges 40 to provide for opening of the box.

Means 16 for retaining the stack within box 26 includes stops 42 which project from each of adjacent side walls 30, 32, 34. The undersides of stops 42 are at a sufficient height from bottom 28 such that a stack 14 of filter 12 can be pushed into box 26 between stops 42 and bottom 28 to provide several days supply of filters. The means for stripping the top filter 12 from stack 14 includes a flexible clear plastic V-shaped element 44 (FIG. 4). The base of element 44 is attached to the flat topped surface of a post 46 which projects vertically upwardly from bottom 28 at approximately the horizontal center of side wall 36. The free ends 48 of element 44 are formed to extend slightly downwardly into the cup-like interior of filter 12. Ends 48 are resilient and exert sufficient force downwardly that movement of the vertically upper edge 50 of filter 12 upwardly past ends 48 can be achieved by the engaging means 18, but ends 48 will hold the next adjacent filter of stack 14 down to insure that only one filter 12 is dispensed from stack 14 at a time. The notch 52 in element 44 is provided to prevent interference between element 44 and engaging means 18.

Lid 38 includes a handle 54. A slot 56 is defined in lid 38, the slot extending generally radially of the axis 22 of stack 14 when lid 38 is in a closed position. A pair of mounting projections or ears 58 extend from the underside of lid 38 downwardly into box 26. Ears 58 are disposed on the two longitudinal sides of slot 56. A mounting projection 60 is provided on the underside of lid 38. Projection 60 extends from the rearward edge of slot 56 toward rear side wall 32, and lies generally between ears 58.

The moving means 20 on apparatus 10 includes a first lever 62 having a first end 64 disposed inside box 26 and generally between ears 58. Lever 62 extends upwardly through slot 56. The second end 66 of lever 62 is enlarged, providing a convenient thumb rest for the operation of apparatus 10, as will be explained. Lever 62 is pivotally mounted between ears 58 upon a bolt 68 which extends through mating holes in ears 58 and is secured to ears 58 by a nut 70.

Engaging means 18 includes a second lever 72 having a first, or upper, end 74 and a second, or lower, end 76. First end 74 is attached to projection 60 by double-acting hinge 78. Projection 60 includes a notch 80 (FIG. 2) which is shaped to receive the first end 74 of lever 72. The first end 74 is urged rearwardly of box 26 by yieldable urging means 82 which is coupled between the rear end of projection 60 and end 74 of lever 72. Eyelets 84 are provided on the rearward side of lever 72 adjacent the first end 74 thereof and at the rear end of projection 60 for mounting urging means 82. Urging means 82 may be a small coil spring or a loop of elastic material. In the illustrated embodiment, urging means 82 is a small rubber band. The double-acting hinge 78 allows end 74 of lever 72 to be moved forward from its rest position in notch 80. Urging means 82 and hinge 78 then provide for movement of end 74 back into notch 80.

The second end 76 of lever 72 is formed to provide a forwardly-extending hard point 86. Point 86 is sufficiently sharp that it becomes imbedded in the cup-like interior surface of filter 12. Point 86 does not extend so far from the otherwise curved smooth surface of end 76 that point 86 can penetrate completely through filter 12 and engage the next adjacent filter in stack 14. Point 86 thus engages only a single filter at a time.

Figure 2:
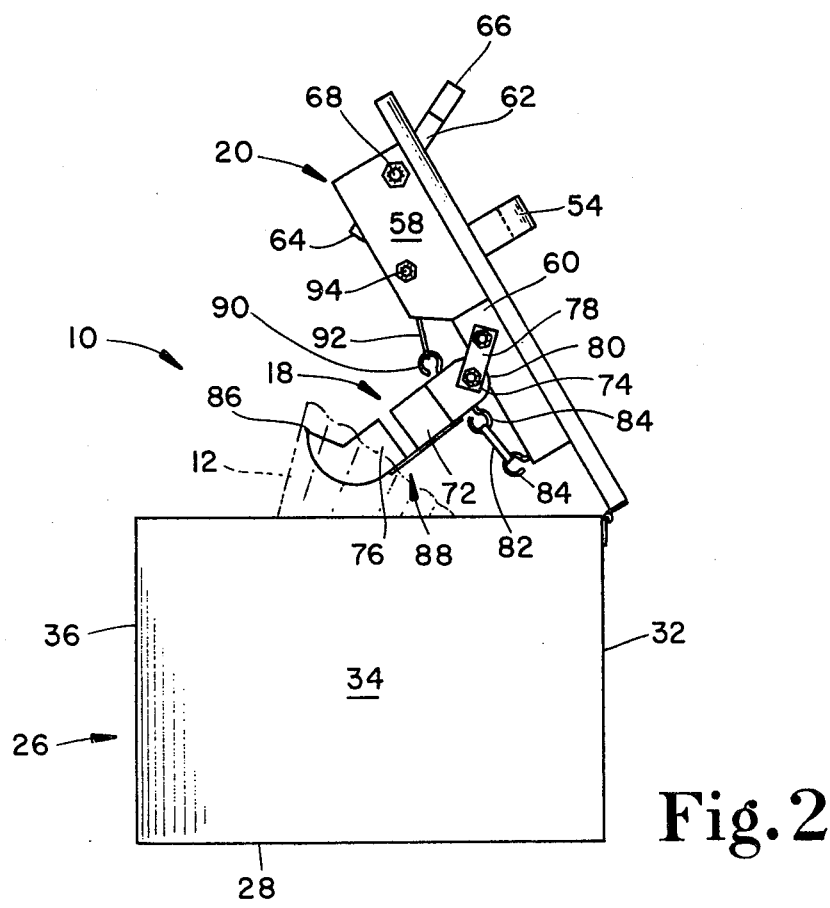
FIG. 2 is a side elevational view of the apparatus of the instant invention, with the lid in its open or dispensing orientation and a single coffee filter from the top of a stack of such filters illustrated in broken lines.

As best illustrated in FIGS. 2-3, a flexible joint 88 is provided on lever 72 intermediate ends 74, 76. Joint 88 is provided by a thin, narrow, resilient metal strip. Joint 88 flexes to damp somewhat the motion of end 76 when a filter 12 is being removed from stack 14. This damping function minimizes the possibility of damage to the filter 12 which is being dispensed.

An eyelet 90 is provided on the forward side of lever 76 adjacent end 74. Moving means 20 includes a cord 92 which is attached to eyelet 90 and to end 64 of lever 62. Cord 92 runs over a bolt 94 which extends through mating holes on ears 58.

Figure 1:
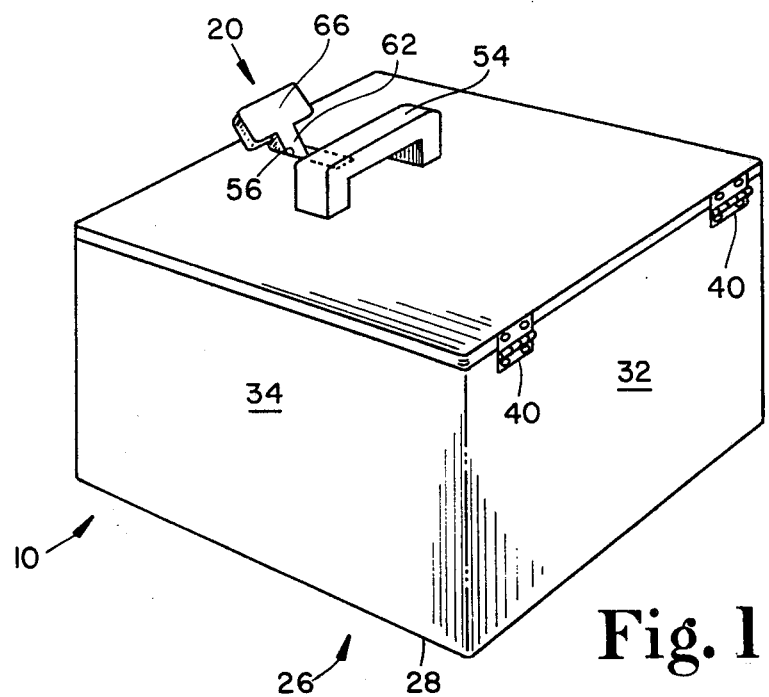
FIG. 1 is a perspective view of the apparatus of the instant invention, showing the rear, top and one side of the dispenser.

In operation, apparatus 10 is loaded with a stack 14 of filters and closed. Apparatus 10 thus appears as illustrated in FIG. 1. To remove and dispense the top filter 12 from the stack, an operator grasps handle 54 and rests his thumb on end 66 of lever 62. The operator then urges end 66 rearwardly of box 26 against the urging of rubber band 82 while raising lid 38. See FIG. 3. Such movement of end 66 pulls end 76 of lever 72, and point 86 forward, point 86 engaging the cup-like interior of filter 12. As point 86 engages filter 12 and moves radially away from the axis 22 of stack 14, lid 38 is raised, imparting a component to the motion of point 86 along axis 22. This lifts filter 12 upwardly. The edge 50 of filter 12 is forced upwardly against element 44. Element 44 is sufficiently flexible to allow edge 50 to pass it. However, the downwardly and inwardly projecting free ends 48 of element 44 catch the vertically upper edge of the next adjacent filter in stack 14, in which filter 12 is nested, and holds this next adjacent filter downwardly against the urging of point 86. Joint 88 resiliently urges filter 12 upwardly along axis 22 and radially outwardly from the axis so that it rides over element 44. As lid 38 is lifted further, filter 12 is disengaged completely from stack 14 and rests upon element 44, separated from the remaining filters in stack 14 thereby.

Joint 88 prevents movement of point 86 from tearing filter 12 by slightly damping movement of point 86 as point 86 encounters resistance to its movement from the surface of filter 12. The resistance of filter 12 to movement past element 44 is also damped by joint 88. Joint 88 thus minimizes the likelihood of damage to filter 12 as it is separated from stack 14.

The separation of filter 12 from the rest of stack 14 by element 44 is enhanced by post 46. Post 46 urges the entire stack rearwardly of box 26 and bends edges of the filters adjacent the post 46. The bending separates the edges of adjacent filters in the stack from one another. One embodiment of the invention was constructed with a post 46 and without an element 44. The post 46 performed the separating function well enough that element 44 could be eliminated.

What is claimed is:

1. Apparatus for dispensing a cupuliform paper article from an end of a stack of such articles comprising means for retaining the stack, the retaining means including a structure having a bottom wall and at least one side wall, the at least one side wall including a stop for limiting movement of the stack, means for engaging the end article of the stack, the engaging means projecting into the end article, means for moving the engaging means away from the axis of the stack, means for imparting an axial component to the motion of the engaging means to lift the end article from the stack as it is moved away from the stack axis, the means for imparting an axial component including a lid hinged to the box-like structure and capable of being opened as the engaging means is actuated, and means for stripping the end article from the next adjacent article in the stack as the engaging means pulls the end article away from the stack axis.

2. The invention of claim 1 wherein the means for stripping the end article from the next adjacent article includes a resilient flexible element and means for supporting the resilient flexible element adjacent the stack, the resilient flexible element projecting into interfering relationship with the end article of the stack, the resilient flexible element being sufficiently flexible that the force it exerts on the end article can be overcome by the engaging means.

3. The invention of claim 1 wherein the lid has a handle and defines a slot which extends generally radially of the stack axis.

4. The invention of claim 3 wherein the moving means includes a first lever having first and second ends, and means for pivotally attaching the first lever intermediate its first and second ends to the underside of the lid, the second end of the first lever extending through the slot for actuation from outside the box.

5. The invention of claim 4 wherein the engaging means includes a second lever having first and second ends, and means for pivotally attaching the first end of the second lever to the underside of the lid, the second end of the second lever projecting into the end article, and means for connecting the second lever intermediate its ends to the first lever adjacent its first end, actuation of the first lever moving the second end of the second lever away from the stack axis.

6. The invention of claim 5 wherein the second end of the second lever is formed to provide a point for engaging the end article.

7. The invention of claim 5 wherein the second lever includes means for providing a flexible joint intermediate its first and second ends, the flexible joint damping motion of the second end of the second lever away from the stack axis to minimize the likelihood of damage to the end article.

8. The invention of claim 5 wherein the engaging means further includes means for yieldably urging the second lever toward the stack axis.

9. The invention of claim 5 wherein the means for pivotally attaching the first end of the second lever to the underside of the lid includes a double-acting hinge, the underside of the lid including means providing a notch in which the first end of the second lever rests, the double-acting hinge providing for movement of the first end of the second lever downwardly out of the notch and transversely to the stack axis as the first lever is actuated.

10. Apparatus for dispensing a paper article from the top of a stack of such articles comprising a box for retaining the stack, the box having a bottom wall upon which the stack rests and a plurality of side walls, at least one of the side walls including a stop for limiting upward movement of a portion of the top article of the stack, means for engaging the top article, the engaging means projecting toward the top article, means for moving the engaging means away from the vertical axis of the stack, means for stripping the top article from the next adjacent article in the stack as the engaging means pulls the top article away from the stack axis, and a hinged lid on the box for imparting an upward axial component to the motion of the engaging means to lift the top article from the stack as the engaging means is moved away from the stack axis, the engaging means being mounted on the lid for movement therewith, the lid being opened as the engaging means is moved away from the stack axis to provide the axial component of motion.

11. The invention of claim 10 wherein the moving means includes a first lever having first and second ends, and means for pivotally attaching the first lever intermediate its first and second ends to the underside of the lid, the second end of the first lever extending through a slot provided in the lid for actuation from outside the box to dispense the top article.

12. The invention of claim 10 wherein the means for stripping the top article from the next adjacent article includes a resilient flexible plastic element and means for supporting the resilient flexible element adjacent the stack, the resilient flexible element projecting into interfering relationship with the top article of the stack and being sufficiently resiliently flexible that the force it exerts on the top article is overcome by the engaging means.

13. The invention of claim 10 and further comprising means for separating the edges of adjacent articles in the stack, the separating means including a post mounted adjacent, and extending generally vertically along, one side wall of the box and urging the stack away from that side wall, the edges of the paper articles contacting the separating means and being deformed thereby, such deformation separating the edges of the adjacent articles in the stack.

14. Apparatus for dispensing a paper article from the top of a stack of such articles comprising means for retaining the stack, means for engaging the top article, the engaging means projecting toward the top article, means for moving the engaging means away from the vertical axis of the stack, means for stripping the top article from the next adjacent article in the stack as the engaging means pulls the top article away from the stack axis, and means for imparting an upward axial component to the motion of the engaging means to lift the top article from the stack as it moves away from the stack axis, the retaining means including a box-like structure having a bottom wall upon which the stack rests and four side walls, at least one of the side walls including a stop for limiting upward movement of a portion of the top article of the stack, the means for imparting an axial component to the motion of the engaging means including a hinged lid on the box, the engaging means being mounted on the lid for movement therewith, the lid being opened as the engaging means is moved away from the stack axis to provide the axial component of motion, the moving means including a first lever having first and second ends, and means for pivotally attaching the first lever intermediate its first and second ends to the underside of the lid, the second end of the first lever extending through a slot provided in the lid for actuation from outside the box to dispense the top article, and the engaging means including a second lever having first and second ends, and means for pivotally attaching the first end of the second lever to the underside of the lid, the second end of the second lever projecting downwardly into the top article, and means for connecting the second lever intermediate its ends to the first lever adjacent its first end, actuation of the first lever moving the second lever away from the stack axis.

15. The invention of claim 14 wherein the second end of the second lever is formed to provide a point for engaging the top article.

16. The invention of claim 15 wherein the second lever includes means for providing a flexible joint intermediate its first and second ends, the flexible joint damping motion of the second end of the second lever away from the stack axis to minimize the likelihood of damage to the top article.

17. The invention of claim 16 wherein the engaging means further includes means for yieldably urging the second end of the second lever toward the stack axis.

18. The invention of claim 17 wherein the means for pivotally attaching the first end of the second lever to the underside of the lid includes a double-acting hinge, the underside of the lid including means providing a notch in which the first end of the second lever rests, the double-acting hinge providing for movement of the first end of the second lever downwardly out of the notch and transversely of the stack axis as the first lever is actuated.

19. Apparatus for dispensing a cupuliform paper article from the top of a stack of such articles comprising means for retaining the stack, the retaining means including a box having a bottom wall upon which the stack rests and a plurality of side walls, the apparatus further comprising means for separating the edges of adjacent articles in the stack, the separating means comprising a post mounted adjacent, and extending generally vertically along, one side wall and urging the stack away from that side wall, the edges of the paper articles contacting a generally vertically extending surface of the post and being deformed thereby, such deformation separating the edges of adjacent articles in the stack, means for engaging the top article, the engaging means projecting into the cup-like interior of the top article, means for moving the engaging means away from the vertical axis of the stack, and a hinged lid on the box for imparting an upward axial component to the motion of the engaging means to lift the top article from the stack as it moves away from the stack axis, the engaging means being adapted for actuation as the lid is raised to permit imparting of the upward axial component and the movement of the engaging means substantially simultaneously.

* * * * *